(12) United States Patent
Ponert et al.

(10) Patent No.: US 8,138,884 B2
(45) Date of Patent: Mar. 20, 2012

(54) ACCESS CONTROL SYSTEM HAVING MULTIPLE SENSING ANTENNA COILS

(75) Inventors: Gregor Ponert, Salzburg (AT); Rudolf Golser, Hallein (AT)

(73) Assignee: SkiData AG, Salzburg (AT)

( * ) Notice: Subject to any disclaimer, the term of this patent is extended or adjusted under 35 U.S.C. 154(b) by 1197 days.

(21) Appl. No.: 11/891,035

(22) Filed: Aug. 8, 2007

(65) Prior Publication Data

US 2009/0051483 A1  Feb. 26, 2009

(30) Foreign Application Priority Data

Aug. 8, 2006 (EP) .................................... 06016587

(51) Int. Cl.
G07C 9/00 (2006.01)
G05B 19/12 (2006.01)

(52) U.S. Cl. .................. 340/5.7; 340/572.4; 340/572.7; 343/853; 235/382

(58) Field of Classification Search .................. 235/375, 235/382, 380, 384
See application file for complete search history.

(56) References Cited

U.S. PATENT DOCUMENTS

| | | | | |
|---|---|---|---|---|
| 4,527,152 A * | 7/1985 | Scarr et al. | ................. | 340/572.2 |
| 5,321,412 A * | 6/1994 | Kopp et al. | ................. | 343/742 |
| 5,653,192 A * | 8/1997 | Sheen et al. | ................. | 119/51.02 |
| 5,661,457 A * | 8/1997 | Ghaffari et al. | ............. | 340/572.7 |
| 5,786,763 A * | 7/1998 | Canipe | ................. | 340/572.7 |
| 6,042,008 A * | 3/2000 | Ando et al. | ................. | 235/384 |
| 6,170,194 B1 * | 1/2001 | Kocznar et al. | ................. | 49/46 |
| 6,450,404 B1 * | 9/2002 | Imazuka | ................. | 235/381 |
| 6,617,960 B1 * | 9/2003 | Fischer et al. | ................. | 340/5.7 |
| 6,744,369 B2 * | 6/2004 | Sata | ................. | 340/573.1 |
| 7,061,383 B2 * | 6/2006 | Davis et al. | ................. | 340/573.1 |
| 7,360,695 B2 * | 4/2008 | Ponert et al. | ................. | 235/382 |
| 7,541,930 B2 * | 6/2009 | Saarisalo et al. | ........... | 340/572.7 |
| 7,762,022 B2 * | 7/2010 | Stadler et al. | ................. | 49/506 |
| 2003/0174099 A1 * | 9/2003 | Bauer et al. | ................. | 343/893 |
| 2005/0168385 A1 * | 8/2005 | Baker | ................. | 343/700 MS |
| 2006/0214799 A1 * | 9/2006 | Yamada | ................. | 340/572.7 |
| 2006/0232382 A1 * | 10/2006 | Bauer et al. | ................. | 340/10.1 |
| 2007/0001002 A1 | 1/2007 | Ponert et al. | | |
| 2007/0018816 A1 * | 1/2007 | Matsui et al. | ................. | 340/551 |
| 2007/0205896 A1 * | 9/2007 | Beber et al. | ................. | 340/572.1 |
| 2008/0088449 A1 * | 4/2008 | Tran | ................. | 340/572.1 |

FOREIGN PATENT DOCUMENTS

| | | | |
|---|---|---|---|
| DE | 100 59 179 C1 * | 6/2002 | |
| DE | 102004013965 B3 | 12/2005 | |
| EP | 1577842 A2 * | 9/2005 | |
| JP | 2000-011107 A * | 1/2000 | |
| JP | 2001-273530 A * | 10/2001 | |

* cited by examiner

*Primary Examiner* — Benjamin C Lee
*Assistant Examiner* — Stephen Burgdorf
(74) *Attorney, Agent, or Firm* — Miller, Canfield, Paddock and Stone PLLC; Mark L. Maki

(57) ABSTRACT

An access control system has at least two antenna coils (12, 13 and 14, 15) arranged one behind the other at an entrance lane (4) and connected to a reading device (20), which with a capacitance (40, 41) form an oscillating circuit (30, 31). Here either the one oscillating circuit (30, 31) with the in entrance direction (5) first antenna coil (12, 13) or the other oscillating circuit with the second antenna coil (14, 15) is actuated by the reading device (20), in order to read out data for the purpose of access authorization from a transponder (22) which is carried by a user and has a transponder coil (24) coupleable with the antenna coils (12 to 15). The oscillating circuit (30, 31) not actuated by the reading device (20) is detuned or short-circuited.

11 Claims, 2 Drawing Sheets

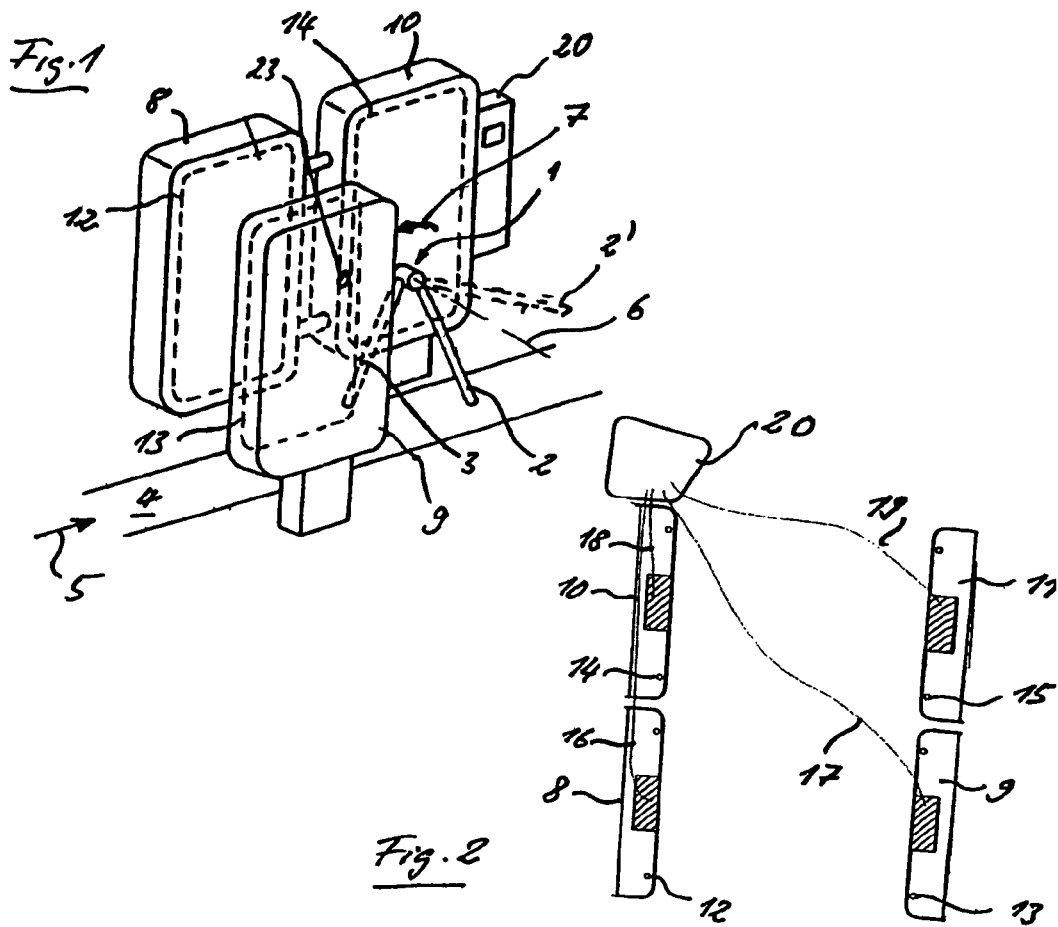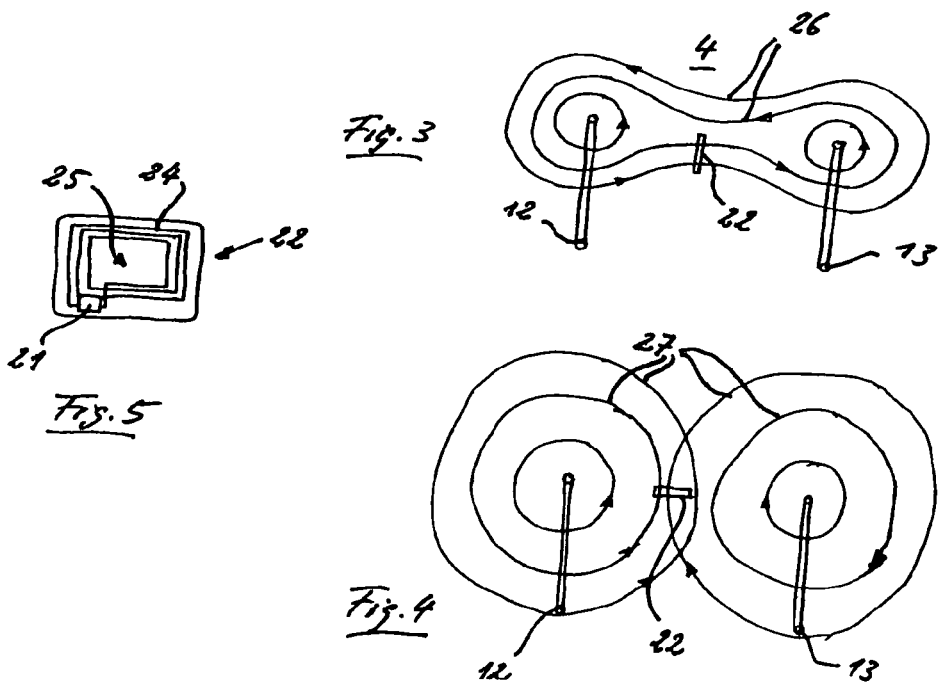

ACCESS CONTROL SYSTEM HAVING MULTIPLE SENSING ANTENNA COILS

The invention relates to an access control system for a normally-open blocking system which controls the passage through an entrance lane.

Such an apparatus is known from DE 10 2004 013 965 B3. Here a turnstile or similar blocking element in its basic position allows access, so that only in case of an access authorization being read as invalid and at the same time a person being detected by means of a people sensor the access is blocked. So as to the blocking element being able to take up its blocking position before the detected person without valid access authorization reaches the blocking element, a first antenna coil having a greater distance to the blocking element and a second antenna coil having a smaller distance is provided at least at one side of the entrance lane. With that it is prevented that a person can pass the blocking element, who waits before the blocking element without valid access authorization until access is released by a second following person having valid access authorization.

The distance of the antenna coils arranged one behind the other on one side of the entrance lane, however, is small. The consequence is an inductive coupling of the antenna coils and thus mutual disturbances, which may render impossible the readout of a transponder.

Therefore, it is the problem of the invention to eliminate such disturbances in a simple fashion.

This is achieved according to the invention with the access control system characterized in the claims wherein pairs of antenna coils are provided. Advantageous embodiments of the invention are specified in the subclaims.

I.e., according to the invention each oscillating circuit can be detuned or short-circuited. With that two antenna coils, which are arranged on one side of the entrance lane in a short distance in entrance direction one behind the other, cannot influence each other when one antenna coil is actuated by the reading device for reading out the data from the transponder, and the other antenna coil is not actuated.

The invention in particular is meant for an access control apparatus according to DE 10 2004 013 965 B3. I.e., for an access control apparatus in the entrance lane of which a blocking system is provided that in its "open gate" basic position releases the entrance and only blocks upon the invalid reading of an access authorization and detection of a person by a people sensor. Here the blocking system is actuated by the reading device in dependence on a valid or invalid reading of an access authorization effected either by the first or the second of the two antenna coils arranged one behind the other. The blocking system can have e.g. a traffic light, which on blocking changes to red and on releasing changes to green, or a turnstile or similar blocking element.

Preferably, to the first and the second antenna coil on the one side of the entrance lane is associated an antenna coil on the other side of the entrance lane. The mutually opposing antenna coils form an antenna coil pair. As to increase the reading reliability, the reading device actuates the respective antenna coil pair, i.e. either the in entrance direction first or the second antenna coil pair at the same time, but alternately in an in-phase or antiphase operation mode.

With each antenna coil a high-frequency field is produced, which permeates the interior of the transponder coil. The frequency can be e.g. less than 135 kilohertz or 13.56 megahertz. By induction at the transponder coil a voltage is produced, on which is based the energy supply of the data carrier (microchip) of the transponder and the data transmission between the reading device and the transponder.

When the two antenna coils of the respective pair are actuated in phase by the reading device, the superposition of the individual fields of the two antenna coils leads to field lines that extend transversely across the entrance lane. Thus, a transponder, the coil surface of which extends in entrance direction, i.e. in parallel to the antenna coils, is permeated by the maximum number of field lines in the interior of the transponder coil, so that the reading reliability reaches a maximum.

In contrast to the in-phase operation mode, the superposition of the individual fields of the two antenna coils in the antiphase operation mode leads to field lines that extend in particular in the middle of the entrance lane between the two antenna coils alongside the entrance lane. I.e., when the coil surface of the transponder coil is arranged at right angles to the entrance direction, the interior of the transponder coil is permeated by the maximum number of field lines and thus the maximum reading reliability is achieved.

Then the one operation mode with which a transponder is detected in the entrance lane is maintained until the reading transaction is completed.

By detuning or short-circuiting the antenna coils or antenna coil pairs arranged one behind the other according to the invention it is achieved that the non-active antennas, i.e. the antennas not activated by the reading device for exchanging data do not influence the field course caused by the antennas active at that time.

For detuning or short-circuiting the respective oscillating circuit that is not actuated by the reading device for reading out data from the transponder, each oscillating circuit is provided with detuning or short-circuiting electronics. For this purpose each detuning or short-circuiting electronics unit has at least one switch, preferably a diode switch, a low-voltage DC voltage, i.e. a DC voltage of less than 42 V, in particular approximately 5 V, being used for supplying such diode switch with power. This switching voltage is also used for the switch signal.

With that the high-frequency cable, which connects the reading device with the oscillating circuit with the respective antenna coil, at the same time can be used for the power supply and for transmitting the switch signals. With that for activating the detuning or short-circuiting electronics additional cables do not have to be laid out, which is an important advantage, in particular when a front and a rear antenna coil pair is used, i.e. four oscillating circuits are provided, which have to be detuned or short-circuited.

When two or more access barriers are provided, the access barriers preferably are operated in a parallel or asynchronous fashion. With that a multiplexer between the barriers is no longer necessary, which means a substantial saving of time.

The access control system according to the invention is suitable, for example, for ski lifts and similar transport systems. It is obvious that it can also be used for other applications, for example buildings, stadiums, public swimming pools and similar institutions.

In the following the invention is explained in more detail by way of example with reference to the attached Figure.

FIG. 1 shows a perspective view of an entrance lane having an access control apparatus for the "open gate" operation, the one antenna coil of the antenna coil pair adjoining the turning blocking device being left out;

FIG. 2 shows a schematic plan view onto the entrance lane according to FIG. 1, the turning blocking device being left out;

FIGS. 3 and 4 show sections of two opposite antenna coils of the apparatus according to FIGS. 1 and 2 with the field line course in an in-phase or in an antiphase operation mode;

FIG. 5 shows a plan view onto a transponder coil; and

Figure 6:
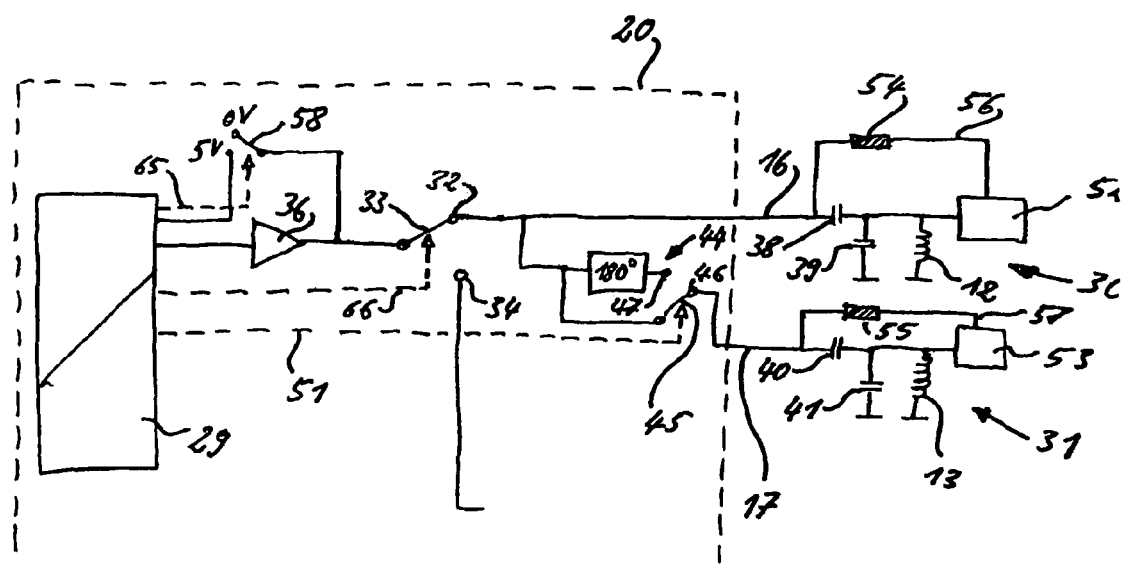
FIG. 6 shows an embodiment of a circuit configuration for the access control system according to the invention.

According to FIG. 1 the access control apparatus has a turning star with two barrier arms 2, 3 as blocking element 1 for blocking entrance lane 4, which is passed in the direction of arrow 5. Blocking element 1 is rotatable around axis 6 inclined in relation to the horizontal line. Each of the two barrier arms 2, 3 encloses an angle of about 45° with the axis of rotation 6 and with each other they enclose an angle of about 120°. FIG. 1 shows the barrier arms 2, 3 in the "open gate" basic position, where they release the entrance 4. By rotating the blocking element 1 corresponding to the arrow 7 the barrier arm 2 is turned upward into the position 2' represented by dashed lines in FIG. 1 and thus the entrance 5 is blocked. Instead of the two barrier arms 2, 3 only one single barrier arm can be provided, which with the rotation axis 6 encloses an angle of about 45° and is rotatable into the blocking position 2'. This barrier arm can be rotatable always in the direction of passage (block-release) or can be moved in two directions.

According to FIGS. 1 and 2 in each of the housings 8, 9, 10, 11 an antenna coil 12, 13, 14 or 15 is arranged respectively. The antenna coil 12 and 13, which are arranged on opposite sides of the entrance lane 4, form a first antenna coil pair, and the antenna coils 14 and 15 form a second antenna coil pair. Antenna coils 12 to 15 are connected via HF-cable 16, 17, 18, 19 to a joint reading device 20 (FIG. 2). But it can also be provided that antenna coil pairs 12 and 13 or 14 and 15 respectively each have a reading device.

Reading device 20 actuates blocking element 1. With the in entrance direction 5 first antenna coil pair 12, 13 the access authorization is read out, which is stored in a microchip 21 of the transponder 22 (FIG. 5) carried by the user passing the entrance 4.

If with the first antenna coil pair 12, 13 a valid access authorization is read out, blocking element 1 will remain in release position, i.e. barrier arms 2 and 3 beside entrance lane 4 point downward. If, however, a person whose access authorization has been read as invalid passes the first antenna coil pair 12, 13 and at the same time a people sensor 23, e.g. a light barrier, barrier arm 2 will be swivelled into blocking position 2' shown in FIG. 1 by dashed lines. In order that the user, who then stands in front of barrier arm 2', cannot pass blocking element 1 when a second user having valid access authorization follows, after the detection of a person by people sensor 23 and without a valid reading the first antenna coil pair 12, 13 is deactivated and the second antenna coil pair 14, is switched to an active position.

Here the access authorization of a following person is not detected. Instead, a second check of the access authorization of the person standing in front of barrier arm 2' is effected by antenna coil pair 14, 15. In case of a valid access authorization detected with the help of a second check effected by the antenna coil pair 14, 15, the antenna coil pair 12, 13 is switched to be active and the antenna coil pair 14, 15 is switched to be inactive and blocking element 1 again is turned into the release position.

According to FIG. 5 the RFID transponder 22 substantially consists of the antenna coil or transponder coil 24 with the microchip 21 as a data carrier.

Through the reading device 20 the active switched antenna coil pairs 12 and 13 or 14 and 15 produce a high-frequency field. Here the inductive coupling between the antenna coil pair 12 and 13 and 14 and 15 respectively with the transponder 22 is the stronger, the more field lines permeate the interior 25 of the transponder coil 24.

As shown in FIG. 3 for the active switched antenna coil pair 12 and 13, an in-phase activating of the two antenna coils 12, 13 by the reading device 20 leads to a superposition of the individual fields of the antenna coils 12, 13 at the two sides of entrance lane 4 to field lines 26, which substantially extend at right angles to entrance lane 4.

I.e., when the transponder 22 and thus the transponder coil 24 is arranged alongside the entrance lane 5, i.e. as shown in FIG. 3, in parallel to the antenna coils 12, 13, the interior 25 of the transponder 24 is permeated by the maximum number of field lines 26, so that the power consumption of the transponder 22 and thus the reading reliability achieves the maximum.

However, with the field line course 26 according to FIG. 3 the power consumption and thus the reading reliability is at its minimum, when the transponder coil 24 is arranged at right angles to the entrance direction, i.e. perpendicular to the antenna coils 12, 13, since then no, in any case only few field lines 26 permeate the transponder coil 24.

In contrast to the in-phase operation mode, the superposition of the individual fields of the two antenna coils 12, 13 in an antiphase operation mode according to FIG. 4 leads to field lines 27 which in particular extend in the middle of the entrance lane 4 between the two antenna coils 12 and 13 more alongside the entrance lane 4. I.e., when transponder coil 24 is arranged at right angles to entrance direction 5, i.e. in parallel to the antenna coils 12, 13, the interior 25 of the transponder coil 24 is permeated by the maximum number of field lines 27, as a result of which the reading reliability reaches its maximum.

Therefore, according to the invention, the two antenna coils 12, 13 are actuated at the same time, but alternately either in phase or in antiphase, by the reading device 20.

In the circuit configuration shown in FIG. 6 only the two parallel oscillating circuits 30, 31 for the two in FIGS. 1 and 2 first antenna coils 12 and 13 are displayed, which are connected to the one pole 32 of the diode switch 33, to whose other pole 34 the not displayed parallel circuits with the two according to FIGS. 1 and 2 second antenna coils 14 and 15 are connected. The circuitry of the oscillating circuits of the two antenna coils 14 and 15 connected to the pole 34 of the switch 33 are formed in the same way as the two parallel oscillating circuits 30, 31 connected to the pole 32 of the switch 33 as displayed in FIG. 6.

According to FIG. 6 between the transmitting and receiving electronics 29 of the reading device 20 and switch 33 there is provided a driver 36. Pole 32 of switch 33 via a capacitor 38 is connected with parallel oscillating circuit 30 of antenna coil 12 (inductance) and with the in parallel switched capacitor 39 (capacitance). In contrast, the capacitor 40 of the second parallel oscillating circuit 31, which consists of antenna coil 13 and capacitor 41, is connectable with the pole 32 of the switch 33 via a 180° phase switch 44.

Phase switch 44 consists of a diode switch 45, whose one pole 46 is connected directly with parallel oscillating circuit 31, while the other pole 47 leads to parallel oscillating circuit 31 via a not displayed transformer having two coils for a 180° phase reversal. By switching diode switch 45, the in-phase operation mode of the two oscillating circuits 30, 31 can be switched into the antiphase operation mode.

When the access control apparatus is in operation, diode switch 45 is actuated by transmitting-receiving electronics 29 via control line 51 displayed by dashed lines and thereby is permanently switched back and forth between poles 46, 47. When transmitting-receiving electronics 29 detects a transponder 22, the operation mode, wherein the transponder 22 was detected, is maintained until the reading transaction is completed, i.e. the data exchange between transmitting-receiving electronics 29 and transponder 22 is completed.

I.e., when the transponder 22 according to FIG. 3 is carried e.g. in a side pocket and thus the transponder coil 24 is aligned with the entrance direction 5, i.e. in parallel to the antenna coils 12, 13, and thus the transponder 22 is detected in the in-phase operation mode, i.e. when the diode switch 45 is connected to the pole 46, this operation mode is maintained until the reading transaction is completed, whereas, when the transponder 22 with the transponder coil 24 according to FIG. 4 is carried e.g. in a breast pocket and the transponder 22 thus is detected in the antiphase operation mode, i.e. with the diode switch 45 connected to the pole 47, the antiphase operation mode is maintained during the data exchange. After the end of the transaction, via the control line 51 the switching back and forth of the diode switch 45 is continued.

As to prevent the antenna coils 12, 13 and 14, 15 arranged one behind the other with a small distance of for example less than half a meter influencing each other by inductive coupling at the one or other side of the entrance lane 4 when the one antenna coil pair 12, 13 or 14, 15 respectively is actuated by the transmitting-receiving electronics 29 of the reading device 20 for reading out the data from the transponder 22 while the other antenna coil pair 14, 15 or 12, 13 respectively is deactivated, i.e. is not actuated to read out data from the transponder 22, according to the invention the not actuated oscillating circuit is detuned or short-circuited.

As displayed in FIG. 6 for this purpose for the two oscillating circuits 30, 31 for the first, i.e. in entrance direction 5 front antenna pair 12, 13, each oscillating circuit 30, 31 is provided with detuning or short-circuiting electronics 52, 53. Detuning or short-circuiting electronics 52, 53 for this purpose preferably has a (not displayed) diode switch. Detuning or short-circuiting electronics 52, 53 is supplied with electricity through a low-voltage DC-voltage of e.g. 5 V, which at the same time supplies the switch signal for the diode switch of the detuning or short-circuiting electronics 53, 53.

As to decouple detuning or short-circuiting electronics 52, 53 from the high-frequency alternating voltage of the oscillating circuit 30, 31, there is provided a coil 54, 55 in a line 56, 57, which is connected preceding the entry to the oscillating circuit 30, 31 preceding the capacitor 38, 39 and to the detuning or short-circuiting electronics 52, 53.

For actuating the detuning or short-circuiting electronics 52, 53 of the two oscillating circuits 30, 31 there is provided, for example, an electronic switch 58, which is connected to the 5-V DC voltage for supplying the transmitting-receiving electronics 29 with power.

With that the DC voltage for supplying the detuning or short-circuiting electronics with power and activating it can be supplied via the same high-frequency cable 16, 17 of the detuning or short-circuiting electronics 52, 53 of the oscillating circuits 30, 31, which connects the driver 36 with the oscillating circuits 30, 31.

While the switch 58 is actuated via the control line 65 by the transmitting-receiving electronics 29, the switch 33, which connects the reading device with the two other antenna coils 14, 15, is actuated via the control line 66 of the transmitting-receiving electronics 29. The not-displayed oscillating circuits with the antenna coils 14, 15 are provided with the same detuning or short-circuiting electronics as the oscillating circuits 30, 31 including the coils 54, 55 in the lines 56, 57.

The reading device 20 displayed in FIG. 6 by dashed lines can be formed by a circuit board, which accommodates all the components arranged therein.

In the drawing only one reading device 20 is displayed for the two antennas 12 to 15 lying opposite each other on both sides of the entrance lane 4, but there can also be provided a reading device for each antenna coil pair 12 and 13 or 14 and 15.

The invention claimed is:

1. An access control system comprising: a reading device having a power supply;
first and second pairs of mutually opposing antenna coils wherein said antenna coils of said first and second antenna coil pairs are provided on opposite sides of an entrance lane, said first and second antenna coil pairs being arranged one behind the other at the entrance lane so that said first antenna coil pair is passed first by a user moving through said entrance lane, and said second antenna coil pair is passed thereafter by the user;
said antenna coils of said first and second antenna coil pairs being connected to the reading device by respective cables, and being provided with a capacitance to each form a respective oscillating circuit, said antenna coils being provided for detecting access authorization by reading out data from a transponder, which is carried by said user and has a transponder coil couplable with the antenna coils, wherein either the oscillating circuits associated with the first antenna coil pair are actuated by said reading device during a reading transaction while said oscillating circuits of said second antenna coil pair are deactivated, or the oscillating circuits associated with the second antenna coil pair are actuated by the reading device during the reading transaction while said oscillating circuits of said first antenna coil pair are deactivated; detuning or short-circuiting electronics being provided respectively for each of the oscillating circuits of said first antenna coil pair and said second antenna coil pair wherein the detuning or short-circuiting electronics are switchable by a switch signal to detune or short-circuit the oscillating circuits such that the oscillating circuits of either said first antenna coil pair or said second antenna coil pair when deactivated are detuned or short-circuited by the detuning or short-circuiting electronics, a low-voltage DC voltage being used as a power supply and as the switch signal for the detuning or short-circuiting electronics to detune or short-circuit either said first antenna coil pair or said second antenna coil pair when deactivated, which said low-voltage DC voltage is drawn from the power supply of the reading device; wherein the cables, which connect the reading device with the oscillating circuits of the first and second antenna coil pairs, at the same time being provided for supplying power from the power supply to the detuning or short-circuiting electronics of the oscillating circuits of the first and second antenna coil pairs and for transmitting the switch signals for the detuning or short-circuiting electronics;
a blocking system which releases the entrance lane in a basic position and blocks the entrance lane upon an invalid reading of the access authorization by said first antenna coil pair and detection of a person by a people sensor, said blocking system releasing said entrance lane again upon a valid reading of the access authorization by said second antenna coil pair, wherein the blocking system can be actuated by the reading device in dependence on a valid or invalid reading of an access authorization effected with said first antenna coil pair or said second antenna coil pair;
each of said mutually opposing antenna coils of said first antenna coil pair when actuated, and each of said mutually opposing antenna coils of said second antenna coil pair when actuated, being actuated at the same time by the reading device, but alternately in an in-phase or in an antiphase operation mode, wherein the one operation mode with which the transponder is detected is maintained for reading out the transponder carried by the user until the reading transaction is completed;

wherein when an invalid access authorization is read by said first antenna coil pair and the user is detected by the people sensor, the antenna coils of said first antenna coil pair are deactivated by said detuning or short circuiting electronics and when thereafter a valid access authorization is read by said antenna coils of said second antenna coil pair, said first antenna coil pair is actuated again.

2. The access control system according to claim 1, wherein the detuning or short-circuiting electronics has at least one diode switch for switching of said detuning or short-circuiting electronics in response to said switch signals.

3. The access control system according to claim 1, wherein the detuning or short-circuiting electronics is preceded by a decoupling unit for decoupling an alternating voltage of the oscillating circuit of said first and second antenna coil pairs.

4. The access control system according to claim 3, wherein the decoupling unit is formed by a coil.

5. The access control system according to claim 1, wherein a switch is used for actuating the detuning or short-circuiting electronics of the oscillating circuits.

6. The access control system according to claim 1, wherein said blocking system has a blocking element which normally opens the entrance in said basic position and is actuatable to a closed blocking position which intersects said entrance lane and selectively blocks the entrance lane, said blocking element being moved to said blocking position upon said invalid reading of the access authorization by said first antenna coil pair and detection of a person by said people sensor, and said blocking element being moved again to said basic position releasing said entrance lane upon a valid reading of the access authorization by said second antenna coil pair.

7. An access control system comprising:
a reading device having a power supply;
first and second pairs of mutually opposing antenna coils wherein said antenna coils of said first and second antenna coil pairs are provided on opposite sides of an entrance lane, said first and second antenna coil pairs being arranged one behind the other at the entrance lane so that said first antenna coil pair is passed first by a user moving through said entrance lane, and said second antenna coil pair is passed thereafter by the user;
said antenna coils of said first mad second antenna coil pairs being connected to the reading device and each forming a respective oscillating circuit for detecting access authorization by reading out data from a transponder, which said transponder is carried by said user and is detectable by the antenna coils, wherein either the oscillating circuits associated with the first antenna coil pair are actuated by said reading device through a first switch during a reading transaction while said oscillating circuits of second antenna coil pair are deactivated by said first switch, or the oscillating circuits associated with the second antenna coil pair are actuated by the reading device through said first switch during the reading transaction while said oscillating circuits of said first antenna coil pair are deactivated by said first switch;
detuning or short-circuiting electronics being provided wherein the oscillating circuits of either said first antenna coil pair or said second antenna coil pair when deactivated are detuned or short-circuited by the detuning or short-circuiting electronics, said detuning or short-circuiting electronics being provided respectively for each of the oscillating circuits of said first antenna coil pair and said second antenna coil pair wherein the detuning or short-circuiting electronics are switchable by a switch signal to detune or short-circuit the oscillating circuits such that the oscillating circuits of either said first antenna coil pair when deactivated or said second antenna coil pair when deactivated are detuned or short-circuited by the detuning or short-circuiting electronics, a low-voltage DC voltage being used as a power supply and as the switch signal for the detuning or short-circuiting electronics to detune or short-circuit either said first antenna coil pair or said second antenna coil pair when deactivated, which said low-voltage DC voltage is drawn from the power supply of the reading device;

wherein the cables, which connect the reading device with the oscillating circuits of the first and second antenna coil pairs, being provided with a second switch for selectively supplying said power and said switch signals at the same time by said low-voltage DC voltage to said detuning or short-circuiting electronics of either said first antenna coil pair when deactivated or said second antenna coil pair when deactivated while the other of said first and second antenna coil pairs is activated by said first switch;

a blocking system having a blocking element which normally releases the entrance lane in an open basic position and is actuatable to a closed blocking position which selectively blocks the entrance lane, said blocking element being moved to said blocking position upon an invalid reading of the access authorization by said first antenna coil pair and detection of a person by a people sensor, said blocking element being moved again to said basic position releasing said entrance lane upon a valid reading of the access authorization by said second antenna coil pair, wherein the blocking element can be actuated by the reading device between the basic and blocking positions in dependence on a valid or invalid reading of an access authorization effected with said first antenna coil pair or said second antenna coil pair;

each of said mutually opposing antenna coils of said first antenna coil pair when actuated, or each of said mutually opposing antenna coils of said second antenna coil pair when actuated, being actuated at the same time by the reading device, but alternately in an in-phase or in an antiphase operation mode, wherein the one operation mode with which the transponder is detected is maintained for reading out the transponder carried by the user until the reading transaction is completed;

wherein when an invalid access authorization is read by said first antenna coil pair and the user is detected by the people sensor, the antenna coils of said first antenna coil pair are deactivated by said detuning or short circuiting electronics and when thereafter a valid access authorization is read by said antenna coils of said second antenna coil pair, said first antenna coil pair is actuated again.

8. The access control system according to claim 7, wherein the detuning or short-circuiting electronics have at least one diode switch.

9. The access control system according to claim 7, wherein said blocking element separates said entrance lane into an entrance side and exit side when in said blocking position wherein said first antenna coil pair is located on said entrance side, said second antenna coil pair being located on said exit side and detecting said transponder of said user when said user is located on said entrance side.

10. The access control system according to claim 9, wherein said antenna coils of said first antenna coil pair are deactivated by said detuning or short circuiting electronics when said second antenna coil pair is actuated and detecting said transponder.

11. The access control system according to claim 10, wherein, when said transponder on said entrance side is detected by said second antenna coil pair and the valid access authorization is read by said antenna coils of said second antenna coil pair, said first antenna coil pair is actuated again and said second antenna coil pair is deactivated.

* * * * *